Dec. 15, 1953    J. R. McVEIGH    2,662,725
TURBINE WHEEL ASSEMBLY
Filed Feb. 23, 1950
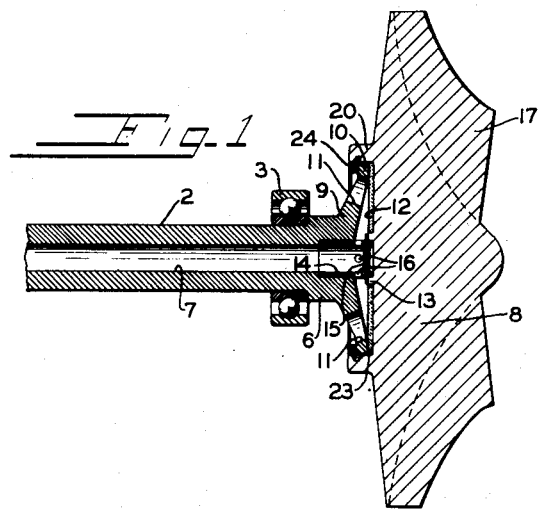
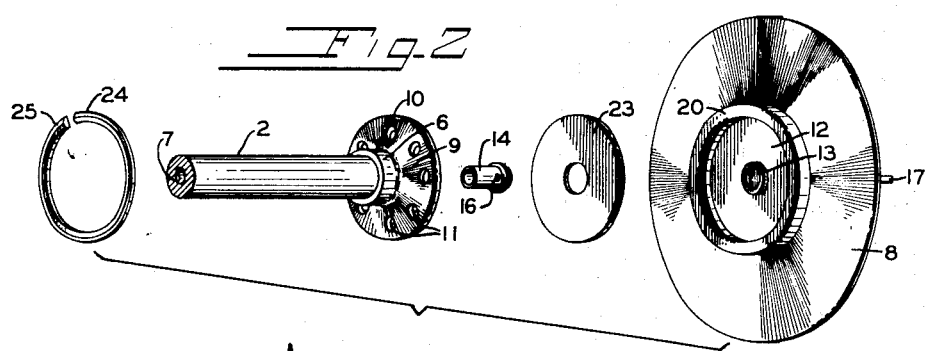
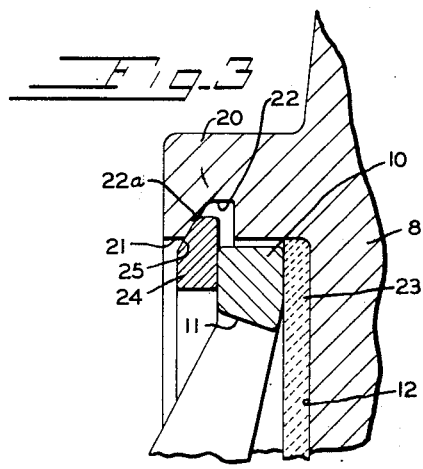
INVENTOR.
JOHN R. McVEIGH
BY *Clarence R. Desjardins*
HIS ATTORNEY Patented Dec. 15, 1953

2,662,725

UNITED STATES PATENT OFFICE 2,662,725

TURBINE WHEEL ASSEMBLY

John R. McVeigh, Latrobe, Pa., assignor to Kennametal Inc., Latrobe, Pa., a corporation of Pennsylvania Application February 23, 1950, Serial No. 145,635

10 Claims. (Cl. 253—39.15)

This invention relates to an improved turbine wheel assembly and has to do, more particularly, with improved means for mounting a turbine wheel or impeller on a shaft to be driven thereby, which mounting is particularly useful in hot air turbines where the impeller works at an elevated temperature considerably higher than that at which it is desired to maintain the shaft.

It has been proposed to make the turbine wheel or impeller of a cemented hard carbide composition, such as cemented titanium carbide, but the use of such materials introduces special problems, which are solved by the invention disclosed herein. The turbine wheel has to be fastened to a steel shaft to transmit torque thereto, but ordinary fastening means are not available because the cemented hard carbide wheel is so hard that it is difficult, if not impossible, to mill it or tap it by the usual machining operations. It is proposed therefore to provide fastening means that cooperate with surfaces formed in the hard carbide composition, before sintering to produce the completed wheel. Another problem arises from the difference in the expansion of the hard carbide impeller and the shaft under heating and this invention provides fastening means that are not affected by this difference in coefficients of expansion. Another problem solved by this invention is that of providing a turbine wheel assembly such as to reduce heat transfer from wheel to shaft, and vice versa, and to facilitate cooling of the assembly.

The principal object of my invention is in the provision of an assembly for a turbine wheel and its supporting shaft, of different coefficients of expansion, which will maintain the parts sufficiently clamped at all times, under varying temperature conditions.

Another object of the invention is in the provision of a turbine wheel assembly which requires no milling or tapping of the turbine wheel, to prepare it for assembling on the shaft.

Another object of the invention is in the provision of an assembly which clamps the assembled parts together by radial movement of a clamping device.

Another object of the invention is to provide assembly in which the clamping pressure between the clamped parts increases in proportion to the speed of their rotation.

A further object of the invention is to provide a turbine wheel assembly so constructed as to reduce heat transfer between the turbine wheel and the supporting shaft and to facilitate cooling.

Still another object of the invention is an assembly which is simple in construction and comprises a minimum number of parts.

A still further object of the invention is a readily attachable and detachable retaining clamp device.

Other objects, and objects relating to details of construction, will definitely appear from the detailed description to follow. In one instance, I have accomplished the objects of my invention by the construction described in the following specification. The invention is clearly defined and pointed out in the appended claims. A preferred embodiment of my invention is illustrated in the accompanying drawings, in which:

Fig. 1 is a longitudinal, sectional view of an assembly of a turbine wheel with impeller vanes thereon and a portion of a supporting shaft.

Fig. 2 is an exploded view of the supporting shaft, the turbine wheel, the expansible snap ring, and other parts of the assembly.

Fig. 3 is an enlarged sectional view corresponding to a part of Fig. 1 showing the cooperating engagement of the spider, clamping ring and turbine wheel.

The invention generally described relates to an assembly including a turbine wheel of any suitable material but, preferably, one of sintered or cemented hard carbide composition, such as cemented titanium carbide, with one or more vanes formed thereon. There is a seating face formed on the inner side of the turbine wheel with a continuous, or interrupted, annular flange disposed about the periphery of the seating face coaxial with the wheel and projecting from the side of the wheel to provide a wall surrounding the seating face. An annular groove, preferably with a tapered side wall, is formed in the inside wall of the flange for seating a resilient, expansible metallic split ring, having one side portion tapered, for being sprung into the groove with its tapered side contacting with the tapered wall of the groove. A supporting shaft carries a spider or flange at one end in position for the rim of the spider or flange to seat against the seating portion of the turbine wheel or an insulating disc inserted therein. The spider or flange is circular, as is the seating portion on the turbine wheel and the surrounding wall, and the diameter of the spider or flange is sufficiently less than the diameter of the surrounding wall to provide ample clearance for allowing maximum radial expansion of the spider or flange within the confines of the surrounding wall. The spider or flange is provided with one or more holes or perforations through its web portion, between the shaft and the rim of the spider, for the circulation of the cooling fluid therethrough. The tapered portion of the split snap ring and its radial expansion within the annular groove of the surrounding wall exerts constant pressure against the spider or flange for holding it firmly against the seating face of the turbine wheel for assembling the wheel to the shaft. The high speed of rotation of the wheel and ring further expands the ring radially by centrifugal force to increase the clamping pressure in proportion to the speed of rotation.

Referring specifically to the drawings, in which like numerals are used to designate like parts, the hollow supporting shaft 2 is rotatably mounted in a conventional ball bearing 3, having inner and outer raceways with a series of balls interposed therebetween. The inner raceway is fixed to the outer wall of the shaft 2 against the shoulder of an enlarged or thickened hub portion 6, and the outer raceway is fixed to any suitable support on which the shaft is to be mounted. The shaft 2 is hollow with a longitudinal bore 7 extending throughout its length for circulating a cooling fluid, such as air, therethrough, and against the face of a turbine wheel 8 mounted on the shaft. The thickened end 6 of the shaft has an annular spider 9 fixed thereto, integral therewith, with its web portion terminating in a rim 10, the web portion being provided with one or more holes 11, through which the air, circulated through the shaft, is expelled adjacent the rim portion of the spider.

One side of the turbine wheel 8 is provided with a seating face 12, surrounding its hub 13, in which a centering dowel 14 is fitted in axial alignment with the wheel and the shaft, one end of the dowel being inserted in the bore 7 of the shaft and its opposite end in the wheel hub. The centering dowel is in the form of a hollow sleeve closed at one end and open at the other end. The open end is within the shaft, forming a continuation of the bore 7, and the opposite end, adjacent the wheel, is closed by transverse web 15. Radial openings 16 are formed in the circumferential wall of the centering dowel sleeve, adjacent the turbine wheel, for directing the circulating fluid from the shaft bore 7 over the side of the turbine wheel and out through the holes 11 in the spider or flange on which the wheel is mounted.

An annular flange 20 is formed about the seating face 12, projecting therefrom to an extent substantially greater than the thickness of the rim portion 10 of the spider. This flange 20 has an inside wall 21 with an annular groove 22 formed therein, the groove being preferably formed with a tapered side wall 22a for contact with the clamp ring. An insulating disc 23 of any suitable hard insulating material, such as ceramic, is disposed on the seating facge 12 of the turbine wheel between the hub 13 and the surrounding flange 20 with its outer portion in position to be interposed between the rim 10 of the spider and the seating face 12 of the turbine wheel.

One or more vanes 17 are formed on the opposite side of the turbine wheel, which may be of conventional form except for the flanged side for cooperating with the clamping ring. The turbine wheel is preferably made from a cemented hard carbide composition, such as sintered titanium carbide, such material being extremely resistant to the corrosive action of hot gases at the high temperatures at which a hot gas turbine works. The thermal coefficient of expansion of a cemented titanium carbide wheel is about $4.5 \times 10^{-6}$, whereas that of the steel shaft is about $12 \times 10^{-6}$. Because of this considerable difference in the thermal coefficients of expansion between the parts to be assembled, there is presented the problem of providing a rigid assembly of the parts at high temperatures. The construction of the turbine wheel is such that the sintered titanium carbide wheel requires no milling or tapping, since the necessary flanges, grooves and sockets can be molded or otherwise formed in the powder compact before sintering. The clamp member is a resilient, radially-expansible split ring 24 of steel which has a peripheral outer edge with a tapered side 25 for insertion within the groove 22, with its tapered side bearing against the tapered side wall 22a of the groove, and the opposite side of the ring 24 bearing against the rim 10 of the spider for wedging it, and the insulating disc 23, tightly clamped against the wheel 8. Sufficient clearance is provided between the outer periphery of the spider rim 10 and the inside wall 21 of the annular flange on the wheel to provide for maximum expansion of the spider, and the groove is of sufficient depth to insure the maximum radial expansion which is necessary for the split ring to clamp the spider to the wheel. The wheel is centered on the shaft by the centering dowel 14 interposed between the end of the shaft 2 and the wheel in axial alignment, whereby the wheel is held centered on the supporting shaft by the centering dowel, on the spider on the shaft is axially clamped against the wheel by the wedging ring as it is radially expanded within the annular groove.

The clamp ring is of sufficient resilience to be sprung into place and to be held in the groove. Wedging action is exerted upon the flange or spider by the wedge ring being radially expanded within the annular groove of the wheel flange. If the wheel is rotating at a relatively low speed, very little clamping pressure is necessary, as the torque transmitted from wheel to shaft is negligible. However, as the speed of revolution increases, so does the torque between the wheel and shaft, and accordingly the clamping pressure of the ring against the spider is correspondingly increased by the centrifugal force exerted to expand the ring. As the speed of rotation is reduced, so is the clamping pressure of the ring against the spider. It is readily apparent that the clamping pressure of the ring is regulated proportionally to the speed of rotation of the assembled parts, and that while the parts are tightly clamped in assembled relation, adequate provision is made for the necessary relative movement between the assembled parts due to any difference in their coefficients of expansion.

It will be evident that a turbine wheel assembly has been provided that does not require any milling or tapping of the turbine wheel to prepare it for fastening to the supporting shaft, and hence the wheel may be made of a difficultly machinable material, such as a cemented hard carbide composition. Furthermore, the means for securing the wheel to the shaft is of such nature as not to be affected adversely by differences in thermal expansion of the wheel and shaft, or parts carried thereby. The means for locking the wheel to the shaft become more effective as the speed of rotation increases, since centrifugal force tends to expand the split clamping ring thus wedging the spider more firmly against the turbine wheel. It is to be noted that a clearance is provided between the rim 10 of the spider and the flange 20 of the turbine wheel, and that said spider bears against the ceramic insulating disc 23. Thus, the contacts between the spider and the turbine wheel, through which heat transfer by conduction may occur, are limited to the clamping ring and the dowel 14. Accordingly, the opportunities for such heat transfer are reduced. Cooling may be effected by circulating air through the bore 7 of shaft 2, holes 16 of the dowel sleeve, against the ceramic insulating disc 23, and out through the holes 11 in the spider.

The turbine wheel assembly shown herein is intended primarily for use in a hot gas turbine in which the impeller is working at high temperatures, but this invention is applicable to any situation in which a wheel working at a high temperature is to be mounted on a shaft operating at room temperature. It is also applicable to situations, such as occur in refrigerating machines, in which a wheel working at low temperatures is to be mounted on a shaft at room temperature.

I am aware that the device shown herein is susceptible of considerable variation without departing from the spirit of my invention, and, therefore, I claim my invention broadly, as indicated by the appended claims.

Having thus described my invention, what I claim as new and useful and desire to secure by Letters Patent, is:

1. A turbine wheel assembly comprising the combination of a supporting shaft having a spider fixed thereon, a turbine wheel provided with a seating portion for the spider, a flange fixed to the wheel surrounding the seating portion and provided with an annular inwardly-opening groove, cooperating centering means on the end of the shaft and the seating portion, a resilient, radially-expansible split ring seated within the groove of the surrounding flange with a portion adapted to engage the spider, and means formed on the ring and flange for causing said ring to engage said spider against the seating portion of the wheel.

2. The turbine wheel assembly set forth in claim 1 in which the means for engaging said ring against the spider for clamping it against the seating portion of the wheel is a wedging means.

3. A turbine wheel assembly comprising the combination of a supporting metal shaft having a spider fixed thereon, a wheel of cemented hard carbide composition provided with a seating portion, an integral flange surrounding the seating portion of the wheel and provided with an annular groove adjacent the seating portion, cooperating centering means on the end of the shaft and the seating portion, and a resilient radially-expansible split ring seated within said groove and engaging the spider to clamp it against the seating portion of the wheel.

4. The turbine wheel assembly set forth in claim 3 in which the split ring has a tapered portion engaging a wall of said groove, said groove wall being tapered.

5. A turbine wheel assembly comprising the combination of a hollow shaft having a spider fixed thereon, a centering dowel on the end of the shaft, a wheel provided with a seating portion, a socket axially centered within said seating portion and receiving the centering dowel, and a flange fixed to the wheel surrounding the seating portion and provided with an annular inwardly-opening groove adjacent the seating portion, an insulating disc surrounding the centering dowel with one face against the spider and its opposite face against said seating portion of the wheel, and a resilient, radially-expansible split ring seated within the groove of the flange and abutting against the spider for clamping it against the disc.

6. The turbine wheel assembly set forth in claim 5 in which the groove has a tapered wall and the split ring has a tapered portion engaging the tapered wall of said groove.

7. The turbine wheel assembly of claim 6 in which the dowel is hollow, communicates with the interior of the shaft, and is provided with holes in its wall, and the web of the spider is also provided with holes, whereby cooling fluid may be circulated through the hollow shaft and dowel, into the space between the spider and the insulating disc, and pass out through the holes in the spider.

8. The turbine wheel assembly comprising the combination of a hollow shaft having a spider fixed thereon, a wheel provided with a hub and a surrounding seating portion for said spider, a centering dowel interposed between the end of the shaft and the wheel hub, a wheel flange having a wall provided with an annular groove, having a tapered side, surrounding the seating portion and the periphery of said spider with a radial clearance provided between the inner wall of the flange and the outer periphery of the spider, and expansible ring means radially and axially movable within the annular groove of the flange between the tapered side of the groove and one wall of the spider, by the centrifugal action of the turbine wheel, for clamping the opposite side of said spider to the seating portion.

9. The turbine wheel shaft assembly set forth in claim 8 in which the radially and axially movable means is an expansible split wedge ring.

10. A turbine wheel assembly comprising the combination of a supporting metal shaft having a spider mounted thereon, a wheel provided with a seating portion for said spider, a flange carried by the wheel surrounding said seating portion and provided with a groove adjacent the seating portion, cooperating centering means on the seating portion and the end of the shaft, and a radially expansible means seated within said groove for engaging the spider to clamp it against the seating portion of the wheel.

JOHN R. McVEIGH.

References Cited in the file of this patent

UNITED STATES PATENTS

| Number | Name | Date |
| --- | --- | --- |
| 2,028,015 | Schippel | Jan. 14, 1936 |
| 2,117,131 | Auger | May 10, 1938 |
| 2,297,508 | Schütte | Sept. 29, 1942 |
| 2,382,947 | Brozek | Aug. 14, 1945 |

FOREIGN PATENTS

| Number | Country | Date |
| --- | --- | --- |
| 417,156 | Germany | Aug. 28, 1925 |